United States Patent [19]

Tsushima et al.

[11] 4,429,469
[45] Feb. 7, 1984

[54] DIRECTION DETECTION APPARATUS

[75] Inventors: Noboru Tsushima, Morioka; Makoto Tomoyori, Iwate; Masatoshi Harumatsu, Tamayama, all of Japan

[73] Assignee: Alps Electric Co., Ltd., Japan

[21] Appl. No.: 320,523

[22] Filed: Nov. 12, 1981

[30] Foreign Application Priority Data

Nov. 13, 1980 [JP] Japan .................................. 55-159897

[51] Int. Cl.³ ............................................ G01C 17/28
[52] U.S. Cl. .......................................... 33/361; 33/356
[58] Field of Search ........................... 33/361, 356, 357

[56] References Cited

U.S. PATENT DOCUMENTS 2,853,795 9/1958 Hurlburt et al. .................. 33/356 X
4,300,390 11/1981 Shimizu ............................. 33/361 X
4,327,498 5/1982 Setter et al. ...................... 33/361 X Primary Examiner—Harry N. Haroian
Attorney, Agent, or Firm—Guy W. Shoup; Eliot S. Gerber

[57] ABSTRACT

A direction detection apparatus comprising a magnetic sensor which senses a geomagnetic azimuth, a turning-angle sensor which senses a turning angle dynamically, a magnetic-disturbance detector which detects a magnetic disturbance on the basis of the output of the magnetic sensor, and a signal switching device which transmits either the magnetic sensor output or the turning-angle sensor output to a display device in accordance with a signal from the magnetic-disturbance detector. The traveling direction of a moving object can be detected as a precise geographic azimuth even when the moving object lies in a place subject to the magnetic disturbance.

5 Claims, 10 Drawing Figures

DIRECTION DETECTION APPARATUS

BACKGROUND OF THE INVENTION

The present invention relates to an apparatus for detecting the direction of a moving vehicle in which a geomagnetic azimuth detector and a turning angle detector are combined.

Heretofore, apparatuses utilizing geomagnetism, for example, the so-called magnetic compass, utilizing the rotation of a magnet, have been often employed in order to detect and indicate the traveling direction of a moving vehicle such as automobile. In such apparatuses, however, a considerable reading error develops due to the vibration or turning of the moving vehicle. As apparatuses free from the disadvantage, there have been devised various devices which apply a method of directly converting a geomagnetic azimuth into an electrical signal, in other words, a flux-gate magnetometer, or which utilize a magnetosensitive device such as Hall device and magnetoresistor.

However, insofar as the method of detecting the geomagnetism is relied on, a precise azimuth signal cannot be obtained in a region where a magnetic disturbance occurs, such as an intense-field region.

As other methods for detecting the direction of a moving object, dynamic turning-angle detecting methods have been devised.

Among apparatuses employing the methods, the most precise apparatus is a gyro-compass. The gyro-compass, however, is very expensive and difficult to be used in mass-produced vehicles, such as automobiles. Besides, for the overland traveling, it is also possible to detect the turning angle of steering or the like. With this method, however, an accumulated error, due to the use for a long term, may become great. In the dynamic turning-angle detection, the most serious disadvantage is that the geographic azimuth cannot be detected at all.

SUMMARY OF THE INVENTION

The present invention has been made in view of the drawbacks described above, and has for its object to provide a direction detection apparatus which can indicate the traveling direction of a moving vehicle as a geographical azimuth on the basis of geomagnetic detection and which can always indicate a precise traveling direction as a geographical azimuth even in a region involving a magnetic disturbance such as an intense magnetic field.

According to one aspect of performance of the present invention, a direction detection apparatus is characterized by comprising a magnetic sensor which senses a geomagnetic azimuth, a turning-angle sensor which senses a turning angle dynamically, a magnetic-disturbance detector which detects a magnetic disturbance on the basis of the output of said magnetic sensor, and a signal switching device which applies either the magnetic sensor output or the turning-angle sensor output to a display device in accordance with a signal from the magnetic-disturbance detector.

PREFERRED EMBODIMENTS OF THE INVENTION

Hereunder, the present invention will be described in conjunction with embodiments.

Figure 1:
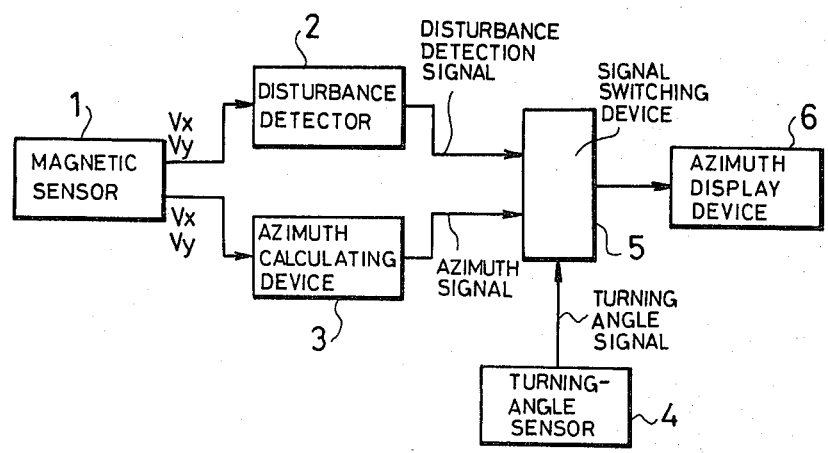
FIG. 1 is a block diagram showing the fundamental construction of a direction detection apparatus according to the present invention.

FIG. 1 is a diagram showing the fundamental construction of the present invention. In the figure, numeral 1 designates a magnetic sensor which generates an electric signal corresponding to a geomagnetic azimuth. On the basis of an output signal from the magnetic sensor 1, a magnetic-disturbance detector 2 detects a magnetic disturbance and generates a magnetic disturbance detection signal. Using the output signal from the magnetic sensor 1, an azimuth calculating device 3 calculates the geomagnetic azimuth and generates an azimuth signal. A turning-angle sensor 4 senses the turning angle of a moving object or the like dynamically and generates a signal corresponding to the turning angle. Numeral 6 designates an azimuth display device which executes the correction processing of a magnetic deviation on the basis of either the azimuth signal from the azimuth calculating device 3 or the turning-angle signal from the turning-angle sensor 4, and which can display a geographic azimuth. In the presence of the magnetic disturbance, a signal switching device 5 responds to the magnetic-disturbance detection signal generated by the magnetic-disturbance detector 2 and supplies the azimuth display device 6 with the turning-angle signal of the turning-angle sensor 4 instead of the azimuth signal generated by the azimuth calculating device 3. More specifically, in a region free from any magnetic disturbance, the geographic azimuth with the magnetic deviation corrected is displayed on the azimuth display device 6 on the basis of the azimuth signal obtained from the magnetic sensor 1 and the azimuth calculating device 3. On the other hand, in case where the moving object has advanced into a region involving the magnetic disturbance, the magnetic-disturbance detection signal is transmitted to the signal switching device 5 by the magnetic-disturbance detector 2. Due to the operation of the signal switching device 5, in the display device 6, the azimuth immediately before the magnetic disturbance is stored, and the azimuth of the moving object is evaluated from the stored azimuth and the turning-angle signal transmitted from the turning-angle sensor 4 and then displayed.

In this way, the traveling direction of the moving object in the magnetic-disturbance region can be displayed on the azimuth display device 6 in terms of the geographic azimuth. When the moving object has advanced into the region free from the magnetic disturbance again, the magnetic-disturbance detector 2 fails to generate the disturbance detection signal. As a result, the signal switching device 5 transmits the azimuth signal of the device 3 to the display device 6 again, and the azimuth display device 6 displays the azimuth based on the azimuth signal of the device 3.

Figure 2:
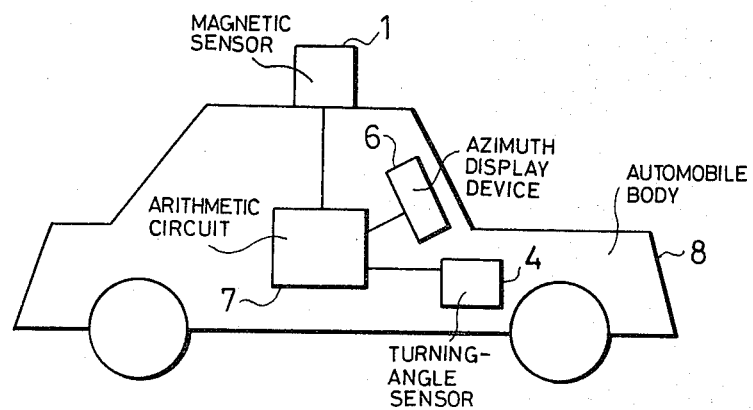
FIG. 2 is a schematic constructional view of the direction detection apparatus installed on an automobile.

FIG. 2 is a schematic constructional view in the case where the apparatus according to the present invention is installed on an automobile by way of example. In the figure, numeral 8 designates the automobile body, and numeral 7 an arithmetic circuit which executes the processings of the azimuth calculation, the magnetic-disturbance detection, the signal switching, etc. Parts 1, 4 and 6 are the same as those in FIG. 1.

Now, there will be described an embodiment of the magnetic sensor which can process a geomagnetic azimuth as an electrical signal.

Figure 3A:
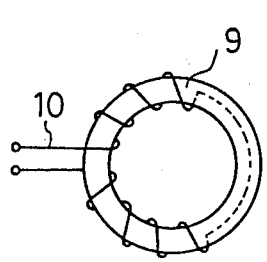
FIGS. 3(a) and 3(b) are schematic views of the head portion of a flux-gate magnetic sensor in the case of employing a toroidal core.
Figure 3B:
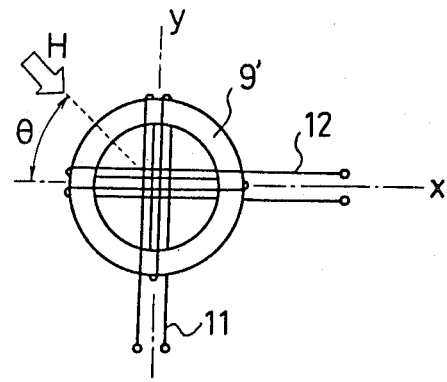

FIGS. 3(a) and 3(b) are schematic views of the head portion of a flux-gate magnetic sensor employing a toroidal core.

In FIG. 3(a), numeral 9 designates a saturable core of high permeability, and numeral 10 an exciting coil for applying an alternating field to the saturable core 9. In FIG. 3(b), numeral 9' indicates a core portion with the exciting coil omitted from the illustration of FIG. 3(a), and numerals 11 and 12 indicate detecting coils which detect the x-directional component and y-directional component of an external input magnetic field H, respectively. When an alternating current is caused to flow through the exciting coil 10 at a frequency f so as to establish an alternating field at which the core 9 becomes above its saturation flux density, secondary high-frequency voltages at excitation frequencies proportional to the x- and y-directional components of the input field H, i.e., $H_x = H \cos \theta$ and $H_y = H \sin \theta$ are respectively generated in the detecting coils 11 and 12. That is, the voltage $V_{x2f} = K' H_x$ is generated in the detecting coil 11, and the voltage $V_{y2f} = K' H_y$ in the detecting coil 12. Here, K' denotes a constant which is determined by the exciting condition.

Figure 4:
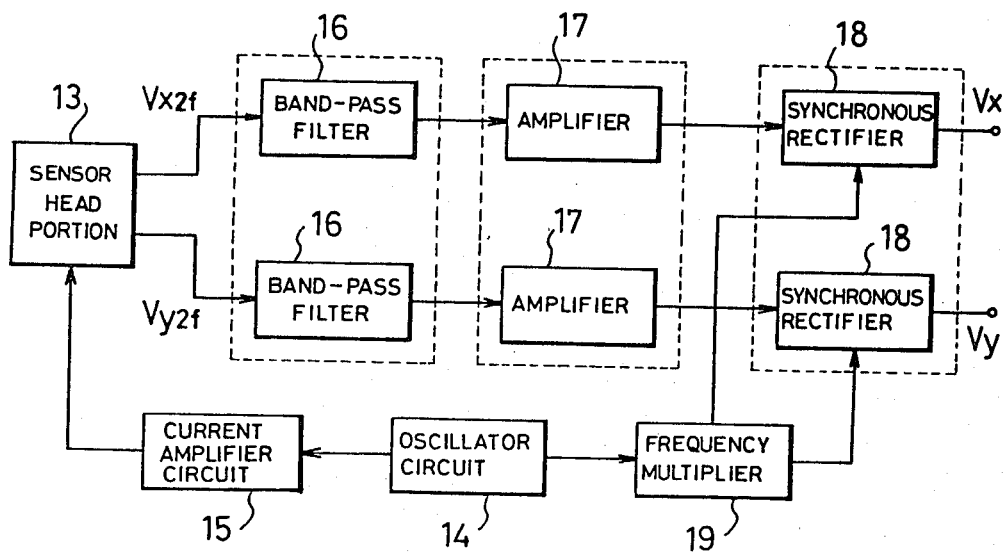
FIG. 4 is a diagram of the fundamental circuit arrangement of the flux-gate magnetic sensor.

FIG. 4 is a block diagram of the fundamental circuit arrangement of the flux-gate magnetic sensor. In the figure, numeral 13 designates the sensor head portion shown in FIG. 3, numeral 14 an oscillator circuit which supplies an alternating current to the exciting coil of the head portion 13, numeral 15 a current amplifier circuit which amplifies an output from the oscillator circuit 14, numeral 16 a band-pass filter which passes only the secondary high frequency of an output from the head portion 13, numeral 17 an amplifier circuit, numeral 18 a synchronous rectifier circuit which phase-discriminates an output from the amplifier 17 and inverts the discriminated output into a direct current, and numeral 19 a frequency multiplier circuit which gives the synchronous rectifier circuit 18 a reference phase. The circuits 16, 17 and 18 are disposed in the numbers of two in correspondence with the x-directional component and y-directional component. Owing to such circuit arrangement, the following output voltages $V_x$ and $V_y$ are respectively obtained in correspondence with the x- and y-directional components of the input field H:

$$V_x = K H_x = K H \cos \theta$$

$$V_y = K H_y = K H \sin \theta$$

Here, K denotes a constant which is determined by circuit conditions.

Figure 5:
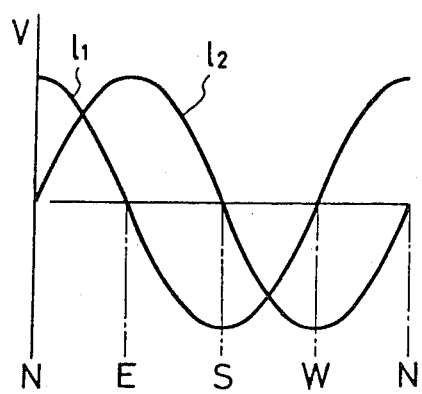
FIG. 5 is a graph showing the variation of the output of the flux-gate magnetic sensor depending upon the geomagnetic azimuth.

FIG. 5 illustrates the variations of the magnetic sensor outputs $V_x$ and $V_y$ indicated in FIG. 4 in the case where the input magnetic field is the geomagnetism. In the figure, a curve $l_1$ corresponds to the output $V_x$, and a curve $l_2$ to the output $V_y$. When the magnetic sensor is facing the magnetic north N, the voltage $V_x$ becomes the maximum in the plus direction. Conversely, when it is facing the magnetic south S, the voltage $V_x$ becomes the maximum in the minus direction. Similarly, the voltage $V_y$ assumes the maximum plus value at the magnetic east E and the maximum minus value at the magnetic west W. Therefore, the geomagnetic azimuth $\theta$ in the case where the magnetic sensor is fixed can be obtained by executing the following operation:

$$\theta = \tan^{-1} (V_y/V_x)$$

When the voltages $V_x$ and $V_y$ are calculated every fixed time by the use of reference clock pulses, the geomagnetic azimuth $\theta$ changing each time can be digitally calculated. In other words, an azimuth $\theta_n$ at a time $t_n$ can be expressed as follows:

$$\theta_n = \tan^{-1} (V_{yn}/V_{xn})$$

In addition, the detection of a magnetic disturbance is permitted by employing a magnetic sensor which can provide the output voltages $V_x$ and $V_y$ corresponding to the x- and y-directional components of the geomagnetism every fixed time as described above.

Now, the principle of the magnetic disturbance detection will be stated.

Figure 6A:
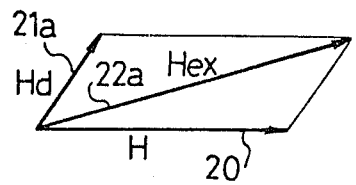
FIGS. 6(a) and 6(b) are vector diagrams each showing the change of a geomagnetic vector due to a typical magnetic disturbance.
Figure 6B:
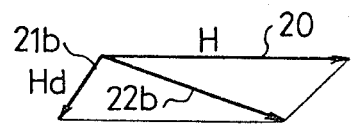

FIGS. 6(a) and 6(b) show the disturbances of the geomagnetism due to magnetic disturbances as vector diagrams. In the figures, numeral 20 indicates a geomagnetism vector H, symbols 21a and 21b indicate disturbing magnetism vectors $H_d$ respectively, and symbols 22a and 22b indicate the resultant vectors $H_{ex}$ between the geomagnetism vectors and the disturbing magnetism vectors respectively. Actually detected by the magnetic sensor due to the magnetic disturbance is not the geomagnetism 20, but is the resultant vector between the geomagnetism vector 20 and the disturbing magnetism vector 22a or 22b.

Therefore, the presence or absence of the magnetic disturbance can be detected by comparing the magnitude of the original geomagnetism vector H and that of the resultant vector $H_{ex}$ between the geomagnetism vector B and the disturbance vector $H_d$. Depending upon the disturbing magnetism vector $H_d$, $|H_{ex}| = |H|$ can hold. Since, however, the disturbing magnetism vector is not constant, it is allowed to judge that $|H_{ex}| = |H|$ hardly holds.

Therefore, the detection of the magnetic disturbance can be satisfactorily executed by the comparison between $|H_{ex}|$ and $|H|$. That is, the occurrence of the magnetic disturbance can be detected by detecting the magnitude of the magnetism vector every fixed time by the use of the reference clock and always comparing it with the immediately preceding value. More specifically, when the flux-gate magnetic sensor illustrated in or by FIGS. 3(a) and 3(b), FIG. 4 and FIG. 5 is used, the output voltages corresponding to the x- and y-directional components $H_x$ and $H_y$ of the magnetism vector H become $V_x = K H_x$ and $V_y = K H_y$ respectively.

In the absence of the magnetic disturbance, the resultant vector $H_{ex}$ in FIG. 6(a) or 6(b) is equivalent to the geomagnetism vector H, and hence, the output voltages of the magnetic sensor become:

$$V_x = K|H_{ex}|\cos\theta$$

$$V_y = K|H_{ex}|\sin\theta$$

Since $V_x^2 + V_y^2 = K^2|H_{ex}|^2$ is obtained from them, $|H_{ex}|^2 = (V_x^2 + V_y^2)/K^2$ holds, and the value of $(V_x^2 + V_y^2)$ can be used instead of the value of $|H_{ex}|$. That is, the output voltages corresponding to a geomagnetism vector $H_n = H_{exn}$ at a time $t_n$ are:

$$V_{xn} = K|H_{exn}|\cos\theta \text{ and } V_{yn} = K|H_{exn}|\sin\theta.$$

Supposing that a magnetic disturbance has occurred at a time $t_{n+1}$, the relationship between a resultant magnetism vector $H_{exn+1}$ and a geomagnetism vector $H_{n+1}$ at the time $t_{n+1}$ becomes $|H_{exn+1}| \neq |H_{n+1}| = |H_n|$. When expressed with the output voltages of the magnetic sensor, this becomes:

$$(V_{xn+1}^2 + V_{yn+1}^2) \neq (V_{xn}^2 + V_{yn}^2)$$

By putting $V_{xn}^2 + V_{yn}^2 = V_n^2$ and $V_{xn+1}^2 + V_{yn+1}^2 = V_{n+1}^2$ and comparing $V_n^2$ and $V_{n+1}^2$, it can be judged for $V_n^2 \neq V_{n+1}^2$ that the magnetic disturbance has occurred at the time $t_{n+1}$. In actuality, the output voltage involves slight steady fluctuations. Therefore, a minute fluctuation in $V^2$ ascribable to the steady minute voltage fluctuations is set at $\Delta V_o$ as its initial value, and the output voltages at the time $t_n$ and at the time $t_{n+1}$ when the magnetic disturbance has occurred are compared. By putting $V_n^2 - V_{n+1}^2 = \Delta V$, the presence of the magnetic disturbance is represented by $\Delta V_o < |\Delta V|$. In contrast, in the absence of the magnetic disturbance, $\Delta V_o \geq |\Delta V|$ holds. Therefore, the presence or absence of the magnetic disturbance can be detected by performing such comparing operations.

Figure 7:
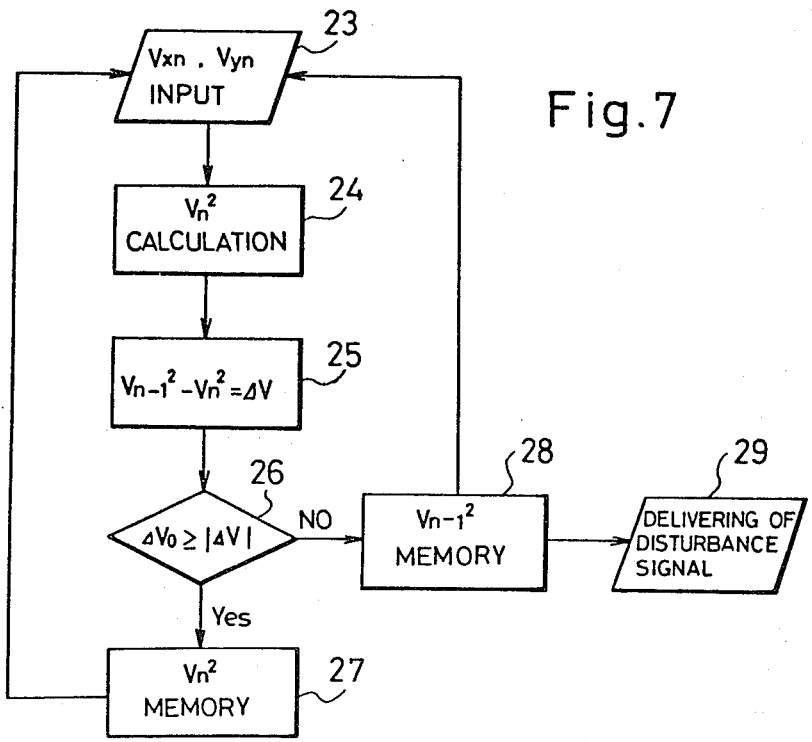
FIG. 7 is a flow chart showing an embodiment of the principle of detecting a magnetic disturbance.

FIG. 7 shows a flow chart of the foregoing principle of the magnetic disturbance detection. In the figure, numeral 23 indicates $V_{xn}$ and $V_{yn}$ at the time $t_n$ as are applied by the magnetic sensor. A step 24 is for the calculating processing of $V_{xn}^2 + V_{yn}^2 = V_n^2$, and a step 25 is for the calculating processing of the difference from a value at the immediately preceding time $t_{n-1}$, i.e., $V_{n-1}^2 - V_n^2 = \Delta V$. A step 26 is for the decision by the comparison between the initial set value $\Delta V_o$ and $|\Delta V|$. In this step, it is decided for $\Delta V_o \geq |\Delta V|$ that no magnetic disturbance exists at the time $t_n$. In a step 27, $V_n^2$ is stored. Further, using inputs at a time $t_{n+1}$, the comparison processings between $V_{n+1}$ and $V_n$ are successively performed. On the other hand, when $\Delta V_o < |\Delta V|$ holds, it is decided that a magnetic disturbance has occurred at the time $t_n$. The value $V_{n-1}^2$ at the time $t_{n-1}$ immediately before the magnetic disturbance is stored in a step 28, and a magnetic disturbance signal is delivered in a step 29. The value $V_{n-1}^2$ immediately before the disturbance as stored in the step 28 is compared with the value $V_{n+1}^2$ of the next time $t_{n+1}$, and serves as the reference value of the comparisons as long as the magnetic disturbance continues. Supposing that the magnetic disturbance has disappeared at a time $t_{n+m}$, $V_{n-1}^2 - V_{n+m}^2 = \Delta V$ is calculated in the step 25, and $\Delta V_o \geq |\Delta V|$ holds in the decision processing 26. Therefore, the magnetic disturbance signal fails to appear, and $V_{n+m}^2$ is stored anew in the step 27. Further, the operating processings from the step 23 are successively repeated.

The detection of the magnetic disturbance can be made by a magnetic-disturbance detector which processes the output of the magnetic sensor in this manner.

Figure 8:
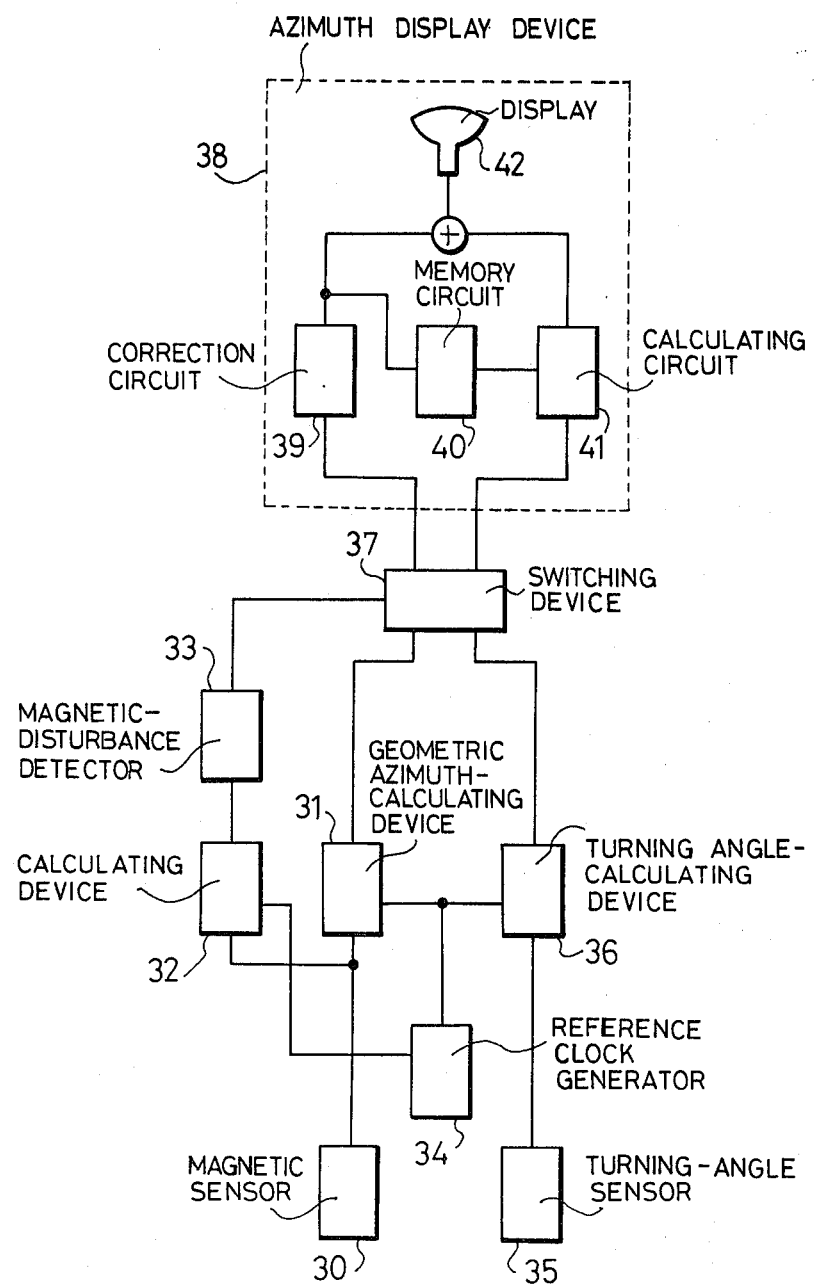
FIG. 8 is a more detailed block diagram of an embodiment of the direction detection apparatus according to the present invention.

FIG. 8 is a block diagram of an embodiment of the direction detection apparatus which has the magnetic-disturbance detector as stated above. In the figure, numeral 30 designates a magnetic sensor, and numeral 31 a geomagnetic azimuth-calculating device which evaluates a geomagnetic azimuth from the output of the magnetic sensor 30. A calculating device 32 executes the calculation of $V_n^2$ in the step 24 in FIG. 7. A magnetic-disturbance detector 33 executes the processings of the steps 25, 26, 27, 28 and 29 in FIG. 7, i.e., the calculation of $\Delta V$ and compares it with the initial set value $\Delta V_o$, thereby to generate the magnetic disturbance signal in the presence of the magnetic disturbance. Numeral 34 indicates a reference clock generator which generates a reference clock, numeral 35 a turning-angle sensor, and numeral 36 a turning angle-calculating device which calculates a turning angle on the basis of an electrical signal from the turning-angle sensor 35. A signal switching device 37 can switch a signal from the magnetic sensor and a signal from the turning-angle sensor therebetween on the basis of the magnetic disturbance signal from the magnetic-disturbance detector 33. An azimuth display device 38 corrects a magnetic deviation and displays the traveling direction of a moving object as a geographic azimuth.

The azimuth display device 38 includes a correction circuit 39 for correcting the magnetic deviation, a memory circuit 40 for storing an immediately preceding azimuth at the magnetic disturbance, a calculating circuit 41 for evaluating an azimuth from the output of the memory circuit 40 and the turning-angle signal at the magnetic disturbance, and a display 42.

In the absence of the magnetic disturbance, the azimuth signal provided from the correction circuit 39 is indicated on the display 42, whereas in the presence of the magnetic disturbance, the azimuth signal provided from the calculating circuit 41 is indicated thereon.

As set forth above, according to the present invention, a direction detection apparatus is constructed of a magnetic sensor which senses a geomagnetic azimuth, a turning-angle sensor which senses a turning angle dynamically, a magnetic-disturbance detector which detects a magnetic disturbance on the basis of an output of the magnetic sensor, and a signal switching device which applies either the magnetic sensor output or the turning-angle sensor to an azimuth display device or the like on the basis of a signal from the magnetic-disturbance detector. Therefore, not only when a moving object lies in a place free from any magnetic disturbance, but also when it lies in a place undergoing a magnetic disturbance such as intense magnetic field, the traveling direction of the moving object can be detected as a precise geographic azimuth at all times. In addition, the present invention has the advantage that the occurrence of an accumulated error is prevented by, for example, correcting the output of the turning-angle sensor with reference to the geomagnetism. By combining the direction detection apparatus according to the present invention with a speed sensor, the moving object can have its present position detected precisely whatever place it is moving in. The invention is greatly effective in this manner.

What is claimed is:

1. A direction detection apparatus for an automobile which includes a display means to show the direction of movement of the automobile, the direction apparatus further comprising a magnetic sensor means for sensing a geomagnetic azimuth and for producing an output signal in accordance with said azimuth, a turning-angle sensor means for dynamically sensing the turning angle of said automobile and producing an output signal in accordance with said turning angle, a magnetic-disturbance detector means for detecting a magnetic disturbance on the basis of the signal output of the said magnetic sensor means and producing a disturbance output signal upon said disturbance, and an automatic signal switching means for applying either the magnetic sensor means output signal or the turning-angle sensor means output signal to the said display device in accordance with said disturbance output signal from said magnetic-disturbance detector means.

2. A direction detection apparatus according to claim 1, and further comprising:

(a) means for comparing, at a sequence of fixed times, a resultant vector which is the product of a geomagnetism vector and a disturbing magnetism vector, with the immediately preceding resultant vector; and, when said magnetic disturbance has been detected by the said comparing means, (b) means for calculating the output of said turning-angle sensor to obtain a correct geographic azimuth by reference to the correct azimuth information which existed immediately before the magnetic disturbance detected by said magnetic sensor.

3. A direction detection apparatus according to claim 2, wherein when the absence of the magnetic disturbance has been detected by said comparing means in obtaining a geographic information based on the output of said turning-angle sensor means, the input azimuth information to said azimuth display device is again obtained from said magnetic sensor.

4. A direction detection apparatus according to claim 1, including means to correct a magnetic deviation so as to correct the azimuth information from said magnetic sensor means and thereby provide a correct geographic azimuth.

5. A direction detection apparatus according to claim 1, wherein said magnetic sensor means includes a flux-gate magnetic sensor head employing a toroidal core.

* * * * *